United States Patent
Walsten

[11] Patent Number: 5,938,180
[45] Date of Patent: Aug. 17, 1999

[54] FISH TAPE END ASSEMBLY

[75] Inventor: Dean R. Walsten, Slinger, Wis.

[73] Assignee: Applied Power Inc., Butler, Wis.

[21] Appl. No.: 09/047,028

[22] Filed: Mar. 24, 1998

[51] Int. Cl.[6] .................................................. H02G 1/08
[52] U.S. Cl. ......................... 254/134.3 FT; 254/134.3 R
[58] Field of Search ................... 254/134.3 FT, 254/134.3 R, 134.7, 134.6

[56] References Cited

U.S. PATENT DOCUMENTS

| | | | |
|---|---|---|---|
| 986,268 | 3/1911 | Colina et al. | 254/134.3 FT |
| 1,783,256 | 12/1930 | Miller | 254/134.3 FT |
| 2,750,152 | 6/1956 | Schinske | 254/134.3 FT |
| 4,635,989 | 1/1987 | Tremblay et al. | 254/134.3 FT |
| 4,684,211 | 8/1987 | Weber et al. | 254/134.3 FT |
| 5,039,196 | 8/1991 | Nilsson | 254/134.3 FT |
| 5,052,660 | 10/1991 | Bergman | 254/134.3 FT |
| 5,503,369 | 4/1996 | Frost et al. | 254/134.3 FT |

*Primary Examiner*—David A. Scherbel
*Assistant Examiner*—Lee Wilson
*Attorney, Agent, or Firm*—Quarles & Brady LLP

[57] ABSTRACT

A cylindrical ferrule having internal threads is joined to a fiberglass fish tape having an outside diameter smaller than the inside diameter of the internal threads. An adhesive between the fish tape and the threads bond the fiberglass and fills voids between the fish tape and threads. The cured adhesive bonded to the fish tape acts on bearing surfaces of the threads to resist loosening and pulling away from the ferrule.

17 Claims, 1 Drawing Sheet

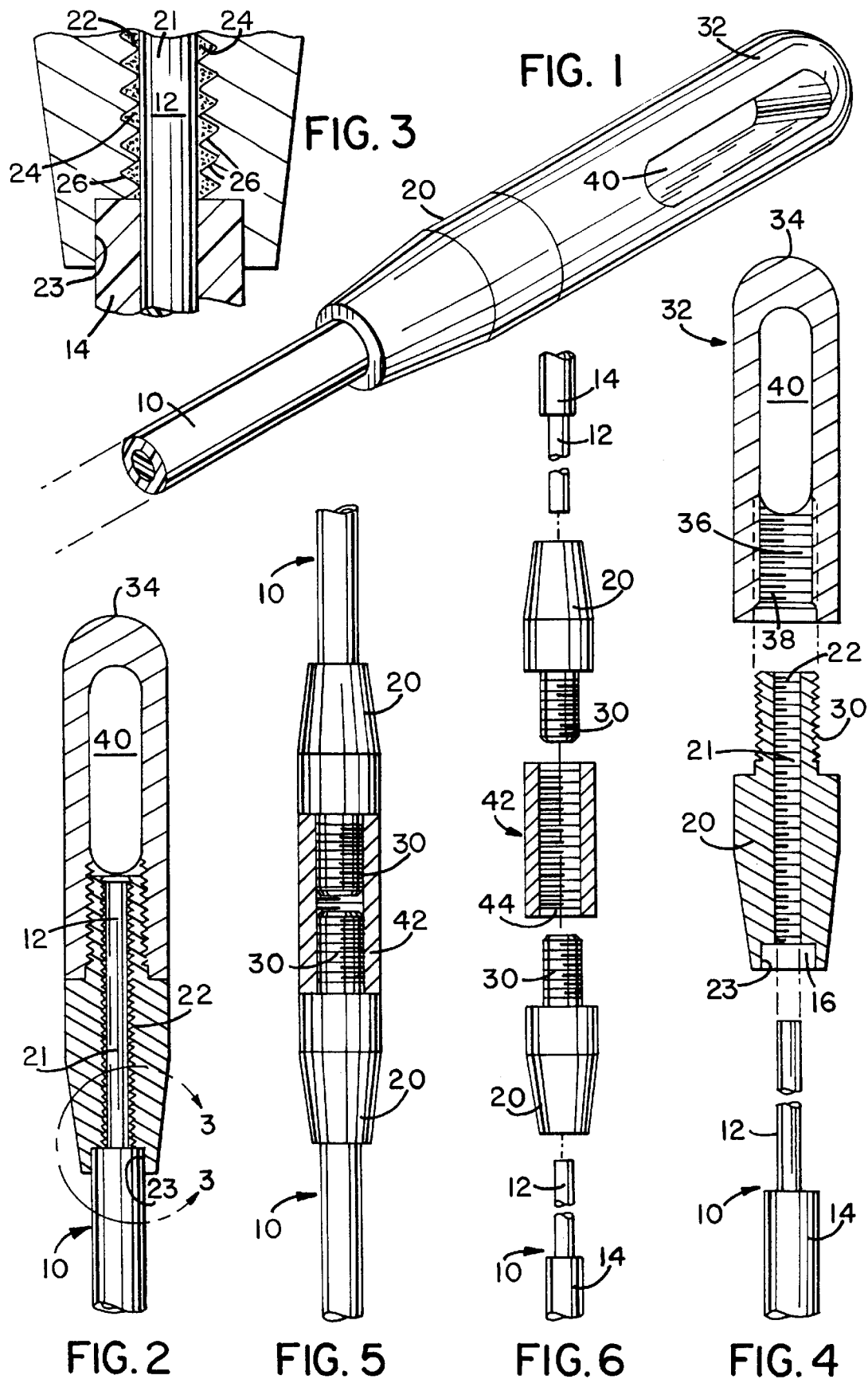

FISH TAPE END ASSEMBLY

CROSS REFERENCES TO RELATED APPLICATIONS

Not applicable

STATEMENT REGARDING FEDERALLY SPONSORED RESEARCH

Not applicable.

FIELD OF THE INVENTION

This invention relates to fish tapes of the type used by electricians to pull wire through conduit or other spaces, and more particularly to the end assembly of a nonconductive fish tape.

BACKGROUND OF THE INVENTION

A fish tape is an elongated wire or nonconductive flexible rod typically used to install wire in conduit or through existing walls. Because typical electrical wire is very flexible, pushing it through long lengths of conduit is virtually impossible. Pulling wire through the conduit is much more effective. However, a pulling device such as a fish tape must be stiff enough to be pushed through conduit, flexible enough to negotiate bends or turns in the conduit, and strong enough to pull multiple wires back through the conduit without breaking or separating from the wire being pulled.

Generally, a fish tape is made of steel or fiberglass with a bent loop or metal ferrule on one end for attaching to the electrical wire that is pulled through the conduit. On steel fish tape, a loop can be bent in the end or, if a ferrule is used it can be attached by various means such as welding or a threaded attachment. These attachment methods, however are not available for fiberglass fish tapes. Welding will melt fiberglass. A threaded connection would cut into the protective skin of the fiberglass damaging the fiberglass integrity and causing the ferrule to separate prematurely from the fish tape. Thus the use of attachment methods effective on steel fish tapes are not effective with fiberglass fish tapes.

Prior art methods for attaching a ferrule to the end of a fiberglass fish tape typically employ a friction connection. One method to attach a ferrule to a fiberglass rod is to crimp the ferrule onto a plastic jacket coating the fiberglass rod, being careful not to damage the fiberglass. Another method is to join the fiberglass rod with a ferrule having a smooth socket interior using an adhesive. This method does not damage the fiberglass rod, but the strength of the connection is still essentially only a friction fit because the adhesive does not bond well to a metallic surface.

Still another method of attaching a nonmetallic fish tape to a ferrule, as disclosed in U.S. Pat. No. 3,858,848, MacFetrich, issued Jan. 7, 1995, is to insert the fish tape into a tubular ferrule having external threads and a portion of its bore conical. The fish tape is then expanded in the conical part of the ferrule bore by threadably inserting a screw into the end of the tape. The expanded tape creates a taper-lock connection with the ferrule. The ferrule is then threadably connected to a head having internal threads.

Continuous use of a fiberglass fish tape employing such a fit to connect the ferrule to the tape end results in the eventual loosening of the connection and separation of the ferrule from the tape. In addition, exerting too much pulling force when pulling wire through a conduit connected to the ferrule may also result in over compression of the end of the fish tape and therefore a separation between the tape and ferrule. Therefore, it is desirable to have a ferrule connecting method and apparatus that does not loosen over time and can withstand a greater pulling force than is currently available in the art.

BRIEF SUMMARY OF THE INVENTION

The present invention is a novel nonconductive fish tape end assembly. An end of a fiberglass fish tape is disposed in a cylindrical ferrule having an axial bore with internal threads. An adhesive is introduced between the fish tape and the threads. The adhesive bonds to the fiberglass and fills the voids between the tape and threads. The cured adhesive bonded to the fish tape acts on bearing surfaces of the threads to resist loosening and pulling away from the ferrule. By providing a connecting method that provides bearing surfaces which resist pulling forces, a general objective to provide a connecting method and apparatus that is stronger than a frictional connection is met.

Another object is to provide a ferrule that has multiple uses. This objective is met by providing a ferrule with external threads. The external threads allow the connection of a head with a slotted hole for attaching wires or a splicing member for connecting another fish tape with a compatible ferrule.

These and other objects of the invention will become apparent from the following detailed description thereof when taken with the accompanying drawings of which:

BRIEF DESCRIPTION OF THE DRAWINGS

FIG. 1 is a perspective view of a first embodiment of a fish tape that employs the present invention;

FIG. 2 is a cross-sectional view of the fish tape of FIG. 1;

FIG. 3 is a fragmentary cross-sectional detail view of the fish tape of FIG. 2;

FIG. 4 is a cross-sectional exploded assembly view of the fish tape of FIG. 1;

FIG. 5 is a cross-sectional view of two fish tape ends of the present invention joined with a splicing sleeve; and FIG. 6 is an exploded view of the embodiment of FIG. 5.

DETAILED DESCRIPTION OF THE PREFERRED EMBODIMENT

The fiberglass fish tape 10 is a flexible fiberglass rod 12 composed of resin-encased fiberglass strands covered in a plastic jacket 14. The jacket 14 protects the rod 12 from damage while in use. The jacket is preferably polypropylene or polyethylene, although any plastic covering with like protective and flexibility properties would work well. The construction of the fiberglass fish tape itself is conventional and does not form part of the present invention. Any suitable fiberglass fish tape could be used to practice this invention.

An adhesive 24, preferably a cyanoacrylate ester, such as LOCTITE 414 available from Loctite Corporation, North American Group, Rocky Hill, Conn. 06067, placed inside the ferrule opening 16 bonds to the fiberglass 12 and fills voids between the internal threads 22 and the fiberglass 12. Although a cyanoacrylate ester adhesive is preferred for its quick set and cure times, other adhesives, such as two part thermoset adhesives may be used. Two part thermoset adhesives, such as epoxies and the like, provide a superior tensile strength at the expense of longer setting and cure times. By providing threads 22 inside the ferrule 20, when the adhesive 24 cures the threads 22 provide bearing surfaces 26 on which the cured adhesive 24 can act when a force is applied to the fish tape 10. Pulling the tape 10 out of the ferrule 20, thus requires a significantly greater force than a friction or taper fit, as provided in the prior art.

In a first embodiment shown in FIGS. 1–4, the ferrule 20 has an opening 16 at one end with internal threads 22 longitudinally therethrough. The threads have an internal diameter of 0.084 inches. A flexible fiberglass rod 12 having an outside diameter of 0.083±0.001 inches is slidably inserted into the opening 16. In order to provide a strong bond between the fish tape 10 and adhesive 24, the jacket 14 is stripped away from the rod 12 prior to insertion into the ferrule opening 16 allowing the adhesive 24 to bond directly with the fiberglass 12. When stripping off the jacket 14, care should be taken not to kink, cut or scrape the resin "skin" of the internal fiberglass rod, since doing so damages the rod.

Allowing the internal threads 22 to cut into the skin of the fiberglass rod 12 would also damage the rod causing breakage under normal operating conditions. Therefore, it is important that the rod 12 outside diameter be smaller than the inside minor (smallest) diameter of the threads 22 to allow the adhesive 24 to avoid marring the rod skin and permit the adhesive to flow freely into voids.

The generally cylindrical ferrule 20 is preferably naval brass, although any material that wears well may be used. A countersunk ferrule bore 16 at one end of the ferrule 20 has its smaller diameter portion 21 provided with internal threads 22 to provide bearing surfaces 26 on which the cured adhesive 24 acts to resist forces pulling the rod 12 out of the opening 16. In the embodiments shown in FIGS. 1–6, the internal threads are formed in a 0.084 diameter bore using a #3–48 UNC tap. In the embodiment shown in FIG. 4, the internal threads 22 are shown to extend in the bore portion 21 all the way longitudinally therethrough. Preferably, the bore portion 21 is open at both ends, to permit the evacuation of air and free flow of adhesive to fill voids without trapping air bubbles when the fish tape rod 12 and adhesive 24 are placed into the bore 21. As such, it is preferred to thread substantially the entire length of the bore portion 21 to maximize the bearing surface and adhesive bond areas, and therefore maximize the strength of the finished joint.

Looking particularly at FIG. 3, the fish tape jacket 14 is tucked into the countersunk portion 23 of the opening 16, thus eliminating a catch point when the fish tape 10 is in use. The ferrule 20 exterior diameter tapers down toward the tape 10, further reducing the potential for snags.

The ferrule end opposite the opening 16 has external threads 30 for multiple uses. In the first embodiment, shown in FIGS. 1, 2, and 4, a conventional, preferably naval brass, head 32 provides an attachment point for wire to be pulled through conduit by the fish tape 10. The head 32 is bullet shaped with a rounded nose 34 at one end. The head 32 has a slotted hole 40 therethrough for attaching wire or the like. An opening 36 with internal threads 38 for receiving the ferrule external threads 30 is at the end opposite the round nose 34. The diameter of the head 32 is equal to the nontapered diameter of the ferrule 20 to eliminate catch points while the fish tape 10 is in use.

A fish tape end construction of the invention may also be used as shown in FIGS. 5 and 6, to create a splice between two fish tapes. A conventional cylindrically shaped splicing sleeve 42 has a longitudinally threaded hole 44 therethrough. External threads 30 of the ferrule 20 described above are received in one end of the splicing sleeve 42. External threads of a second ferrule 20 are received in the other end of the splicing sleeve 42, thereby splicing the ends of two fish tapes together to form a longer fish tape.

While there has been shown and described a preferred embodiment of the invention, it will be obvious to those skilled in the art that various changes and modifications can be made therein without departing from the scope of the invention defined by the appended claims.

I claim:

1. A fish tape end assembly, comprising;

a fiberglass fish tape having an outside diameter;

a ferrule having axial bore which is internally threaded and in which an end of said fish tape is disposed; and an adhesive bonded to said fish tape, said adhesive filling voids between said threads and said fish tape, wherein said adhesive acts on bearing surfaces of said threads when a pulling force acts on said tape.

2. The fish tape end assembly as claimed in claim 1, wherein said ferrule is metallic.

3. The fish tape end assembly as claimed in claim 1, wherein said bore has a countersunk portion, a plastic jacket covers said fiberglass fish tape and said jacket extends into said countersunk portion.

4. The fish tape end assembly as claimed in claim 3, wherein said jacket is bonded to said ferrule in said countersunk portion by said adhesive.

5. The fish tape end assembly as claimed in claim 4, wherein said fish tape has a polyethylene plastic jacket.

6. The fish tape end assembly as claimed in claim 4, wherein said fish tape has a polypropylene jacket.

7. The fish tape end assembly as claimed in claim 1, wherein said internal threads have a minor diameter which is greater than said outside diameter of said fiberglass fish tape.

8. The fish tape end assembly as claimed in claim 1, wherein said adhesive is a cyanoacrylate ester.

9. The fish tape end assembly as claimed in claim 1, wherein said adhesive is a two part thermoset adhesive.

10. The fish tape end assembly as claimed in claim 1, wherein said adhesive is an epoxy.

11. The fish tape end assembly as claimed in claim 1, wherein said ferrule has external threads at an end opposite said tape.

12. The fish tape end assembly as claimed in claim 11, further comprising a cylindrical head having at one end an internally threaded opening for receiving said external threads of said ferrule and a hole formed in another end of said head.

13. The fish tape end assembly as claimed in claim 11, further comprising a cylindrical splicing member having internal threads longitudinally therethrough for receiving said external threads of a pair of said ferrules.

14. The fish tape end assembly as claimed in claim 1, wherein said bore has two ends and both of said ends are open.

15. The fish tape end assembly as claimed in claim 14, wherein said threads extend in said bore from one of said ends to the other of said ends.

16. A method of connecting a fiberglass fish tape to a ferrule comprising the steps of:

applying adhesive to an internally threaded bore of a ferrule;

slidably inserting a fiberglass fish tape into said bore, so that said adhesive fills voids between said fish tape and said internal threads; and curing said adhesive to bond to said fish tape.

17. The method as claimed in claim 16, further comprising the steps of:

stripping away a jacket from said fiberglass fish tape before inserting said end into said bore.

* * * * *